(12) United States Patent
Ogawa et al.

(10) Patent No.: US 7,811,160 B2
(45) Date of Patent: Oct. 12, 2010

(54) OPERATING DEVICE OF VEHICLE AIR CONDITIONER

(75) Inventors: Satoshi Ogawa, Aichi (JP); Tomoyuki Shibata, Aichi (JP); Ryoji Watanabe, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 765 days.

(21) Appl. No.: 10/947,359

(22) Filed: Sep. 23, 2004

(65) Prior Publication Data

US 2005/0098642 A1    May 12, 2005

(30) Foreign Application Priority Data

Sep. 24, 2003    (JP)    .......................... P. 2003-332057

(51) Int. Cl.
B60H 1/12    (2006.01)

(52) U.S. Cl. ...................................... 454/121

(58) Field of Classification Search .................. 454/69, 454/121, 126, 127, 132, 152; 165/41, 42; 200/4

See application file for complete search history.

(56) References Cited

U.S. PATENT DOCUMENTS

| | | | | |
|---|---|---|---|---|
| 4,591,153 A | * | 5/1986 | Krey | 237/12.3 R |
| 5,338,249 A | * | 8/1994 | Hildebrand et al. | 454/126 |
| 5,838,221 A | * | 11/1998 | Jones et al. | 338/152 |
| 6,254,474 B1 | * | 7/2001 | Davidsson | 454/69 |
| 6,398,638 B1 | * | 6/2002 | Shibata et al. | 454/69 |
| 6,517,138 B1 | | 2/2003 | Arthur et al. | |
| 6,521,848 B2 | * | 2/2003 | Shibata et al. | 200/5 R |
| 6,588,675 B2 | * | 7/2003 | Miyai et al. | 236/51 |
| 6,626,232 B1 | | 9/2003 | Spinner et al. | |
| 2002/0003081 A1 | * | 1/2002 | Kawase | 200/4 |
| 2003/0183366 A1 | | 10/2003 | Spinner et al. | |

FOREIGN PATENT DOCUMENTS

| | | |
|---|---|---|
| EP | 1 059 188 | 12/2000 |
| JP | 41-18428 | 8/1941 |
| JP | 59-80929 | 5/1984 |
| JP | 62-169428 | 10/1987 |
| JP | 3-127746 | 12/1991 |
| JP | 10-129361 | 5/1998 |
| JP | 2002-087048 | 3/2002 |

* cited by examiner

*Primary Examiner*—Steven B McAllister
*Assistant Examiner*—Samantha A Miller
(74) *Attorney, Agent, or Firm*—Morgan, Lewis & Bockius LLP

(57) ABSTRACT

A mode selection unit, a blower unit and a temperature control unit are mounted on a cluster panel of a vehicle. The mode selection unit, the blower unit and the temperature control unit have a function of controlling the wind blow position, a function of controlling the wind blow rate and a function of controlling the wind blow temperature respectively, and are constituted by operating mechanisms mechanically separated from one another. Accordingly, the degree of freedom in the layout of the mode selection unit to the temperature control unit is improved so that it becomes easy to dispose them in accordance with the vehicle-side design.

5 Claims, 10 Drawing Sheets

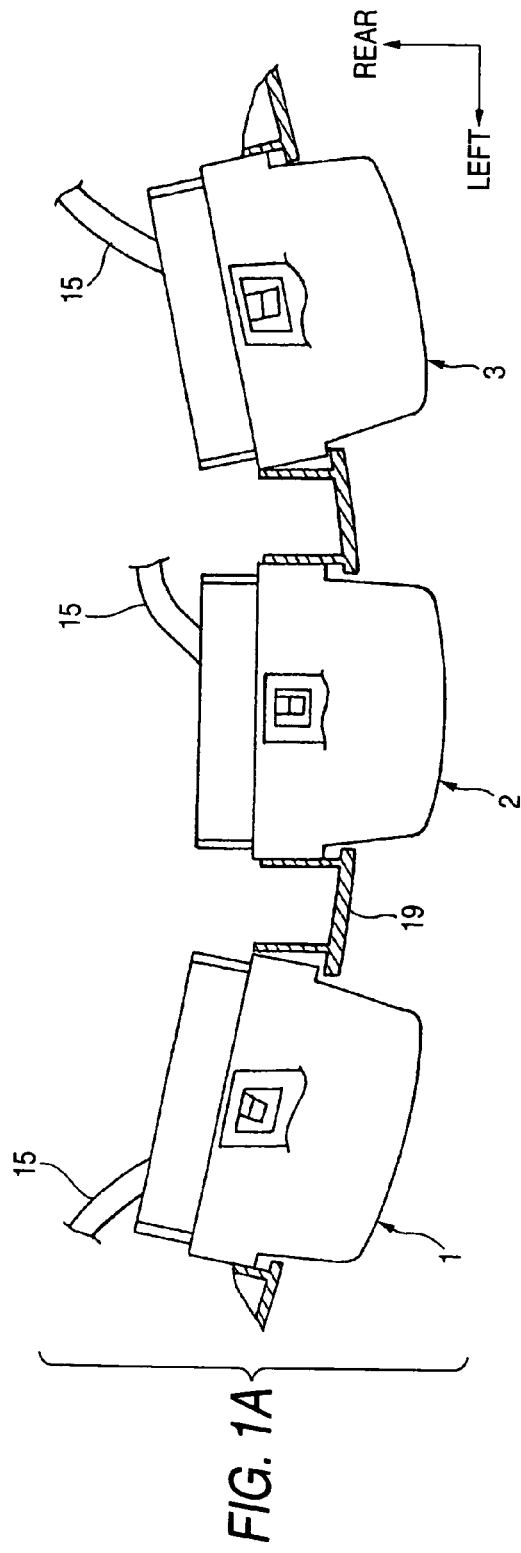
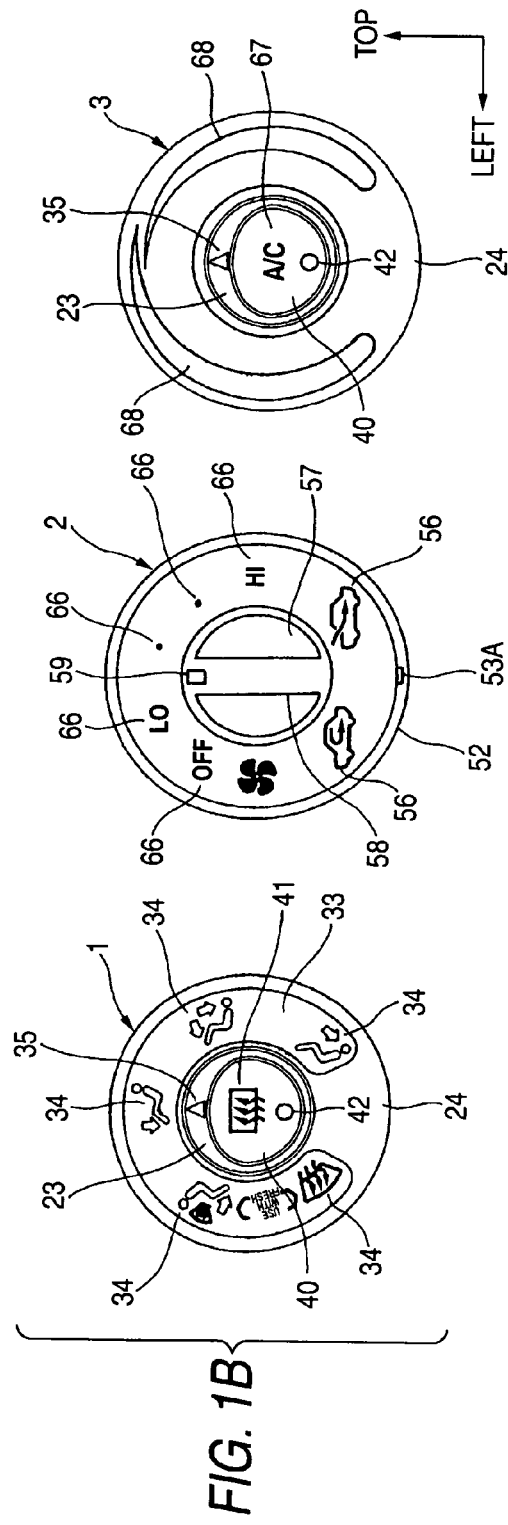
FIG. 1A
FIG. 1B

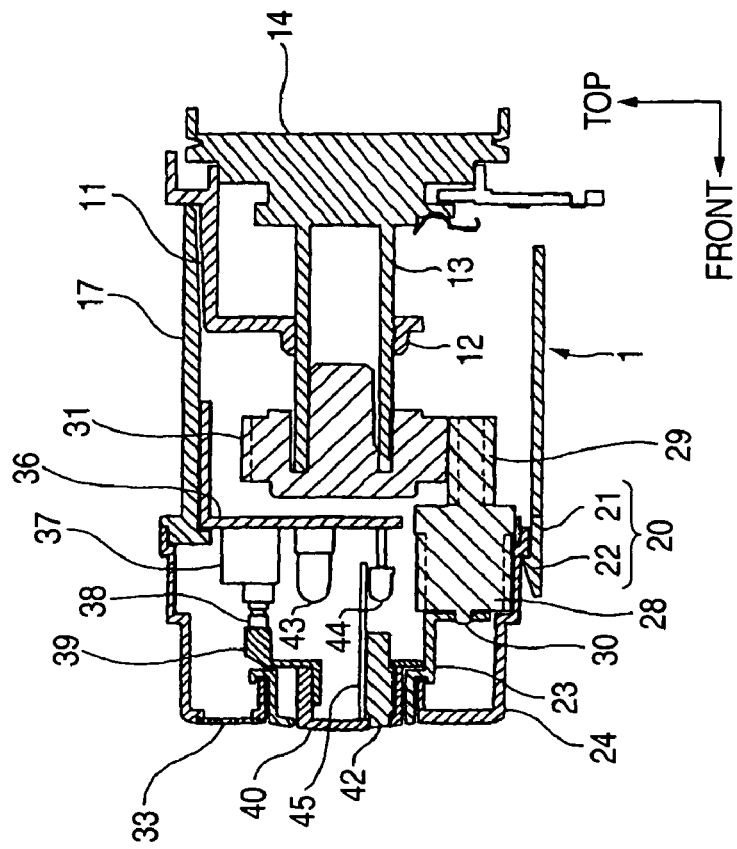
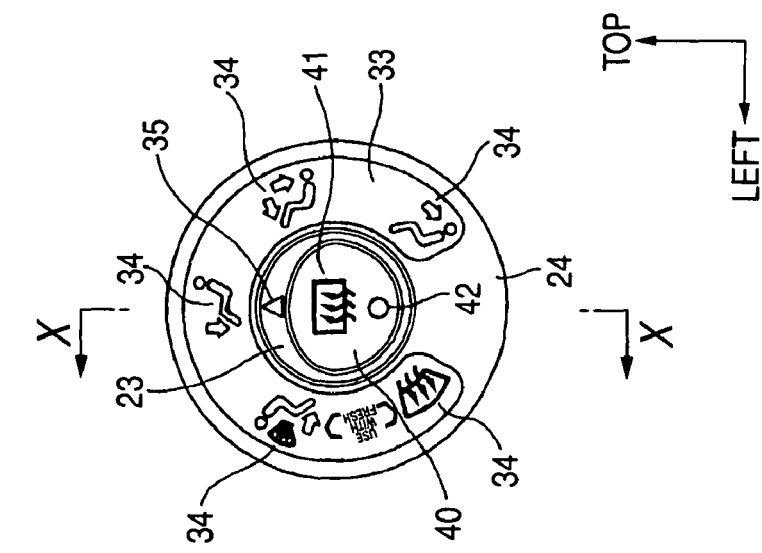

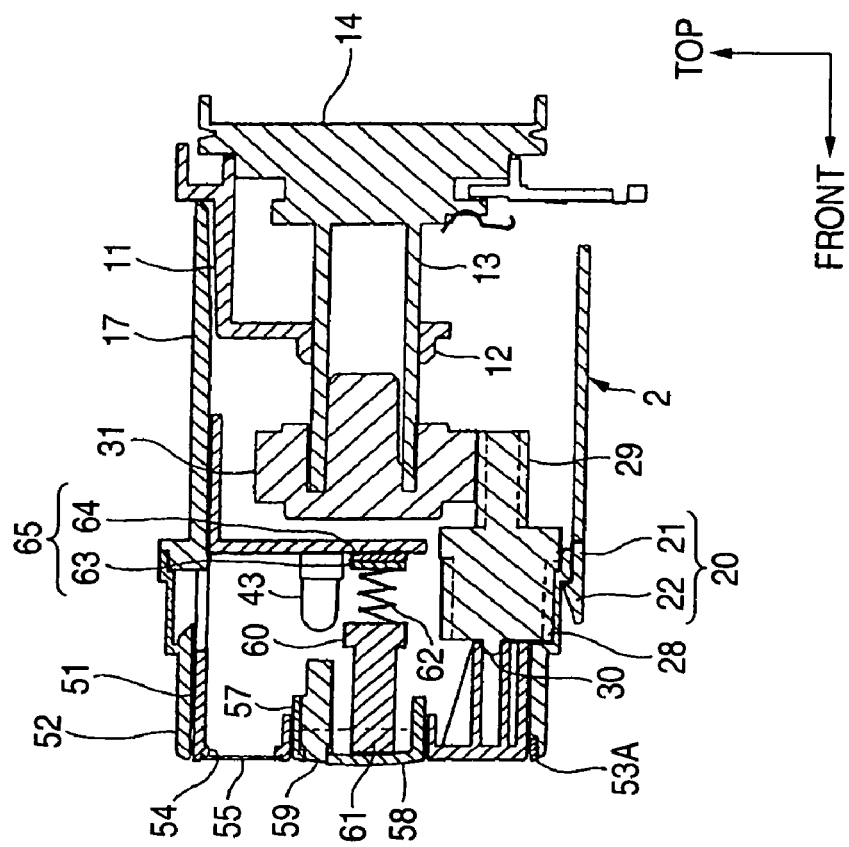
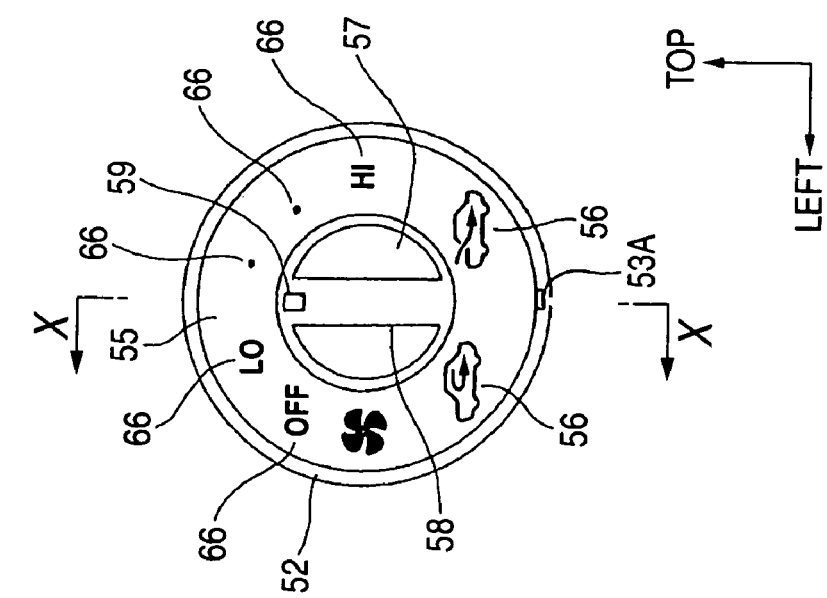

OPERATING DEVICE OF VEHICLE AIR CONDITIONER

BACKGROUND OF THE INVENTION

The present invention relates to an operating device for operating an in-vehicle air conditioner in a vehicle.

Some operating devices have a configuration in which a first operating portion 100 for controlling a wind blow position, a second operating portion 101 for controlling a wind blow rate and a third operating portion 102 for controlling a wind blow temperature are formed into a unit through the intermediary of a base 103 as shown in FIG. 10.

<Problem 1 that the Invention is to Solve>

In this configuration, the degree of freedom in the layout of the first to third operating portions 100 to 102 is so low that it is difficult to dispose the first to third operating portions 100 to 102 in accordance with the vehicle-side design.

The present invention was developed in consideration of the aforementioned situation. It is an object of the invention to provide an operating device of a vehicle air conditioner having a high degree of freedom in layout.

<Problem 2 that the Invention is to Solve>

The procedure for installing the operating device will be described with reference to FIG. 10. First, harnesses 105 are electrically connected to the first to third operating portions 100 to 102 while dials 104 are not attached. The base 103 is attached to an instrument panel 106. Next, a cluster panel 107 is screwed down to the first to third operating portions 102. The dials 104 are attached to the first to third operating portions 100 to 102 through through-holes 108 of the cluster panel 107 respectively. In this case, the first to third operating portions 100 to 102 have to be screwed down to the cluster panel 107. Thus, there is a tendency that the installation cost is increased.

SUMMARY OF THE INVENTION

The present invention was developed in consideration of the aforementioned situation. It is an object of the present invention to provide a method for installing the operating device, in which the installation cost can be reduced.

A first configuration of the invention includes a first operating unit for controlling a wind blow position, a second operating unit for controlling a wind blow rate, and a third operating unit for controlling a wind blow temperature, wherein the first to third operating units are mechanically separated from one another.

A second configuration of the invention includes the steps of electrically connecting harnesses to the first to third operating units, thereafter engaging the first to third operating units to a cluster panel, and attaching the cluster panel to an instrument panel.

According to the first configuration of the invention, the first to third operating units are mechanically separated from one another. Accordingly, the degree of freedom in the layout of the first to third operating units is improved. It is therefore easy to dispose the first to third operating units in accordance with the vehicle-side design.

According to the second configuration of the invention, the first to third operating units are engaged with the cluster panel, and the cluster panel is attached to the instrument panel. Accordingly, it is not necessary to screw the first to third operating units down to the cluster panel. Thus, the installation cost can be reduced.

BRIEF DESCRIPTION OF DRAWINGS

FIGS. 1A and 1B are views showing an embodiment of the invention (FIG. 1A is a sectional view showing the state where an operating device is disposed, and FIG. 1B is a front view thereof).

FIGS. 3A and 3B are views showing a mode selection unit (FIG. 3A is a front view, and FIG. 3B is a sectional view taken on line X).

FIGS. 6A and 6B are views showing a blower unit, corresponding to FIGS. 3A and 3B.

DETAILED DESCRIPTION OF PREFERRED EMBODIMENTS

An embodiment of the invention will be described with reference to FIGS. 1A-1B, 2, 3A-3B, 4-5, 6A-6B and 7-9.

1. Summary

An operating device of a vehicle air conditioner is installed in the inside of a car. The operating device denotes an assembly of a plurality of operating units which are mechanically and electrically independent of one another. The plurality of operating units are fixed to an instrument panel of the car individually. The operating device is constituted by a mode selection unit corresponding to the first operating unit, a blower unit corresponding to the second operating unit, and a temperature control unit corresponding to the third operating unit. Each of the mode selection unit, the blower unit and the temperature control unit can be changed into a form corresponding to the specification of the air conditioner when a part of components thereof is replaced. The detailed configurations of the mode selection unit, the blower unit and the temperature control unit will be described below for each specification.

2. Normal Specification

The normal specification denotes a specification having both an air conditioner function and a heater function. The former air conditioner function is to control the temperature of the air based on heat exchange of the air, and to keep the inside of the car at a set temperature due to the temperature-controlled air blown into the inside of the car. The latter heater function is to heat the inside of the car based on the hot air blown into the inside of the car while using an engine or the like as a source for generating the hot air.

2-1. Mode Selection Unit 1

A unit base 11 made from synthetic resin is fixed to the instrument panel of the car as shown in FIG. 3B. A cylindrical bearing 12 is formed integrally with the unit base 11. A cylindrical shaft 13 is rotatably fitted to the inner circumferential surface of the bearing 12. The shaft 13 is formed out of synthetic resin as its material. A cable base 14 is formed integrally with the shaft 13.

Figure 4:
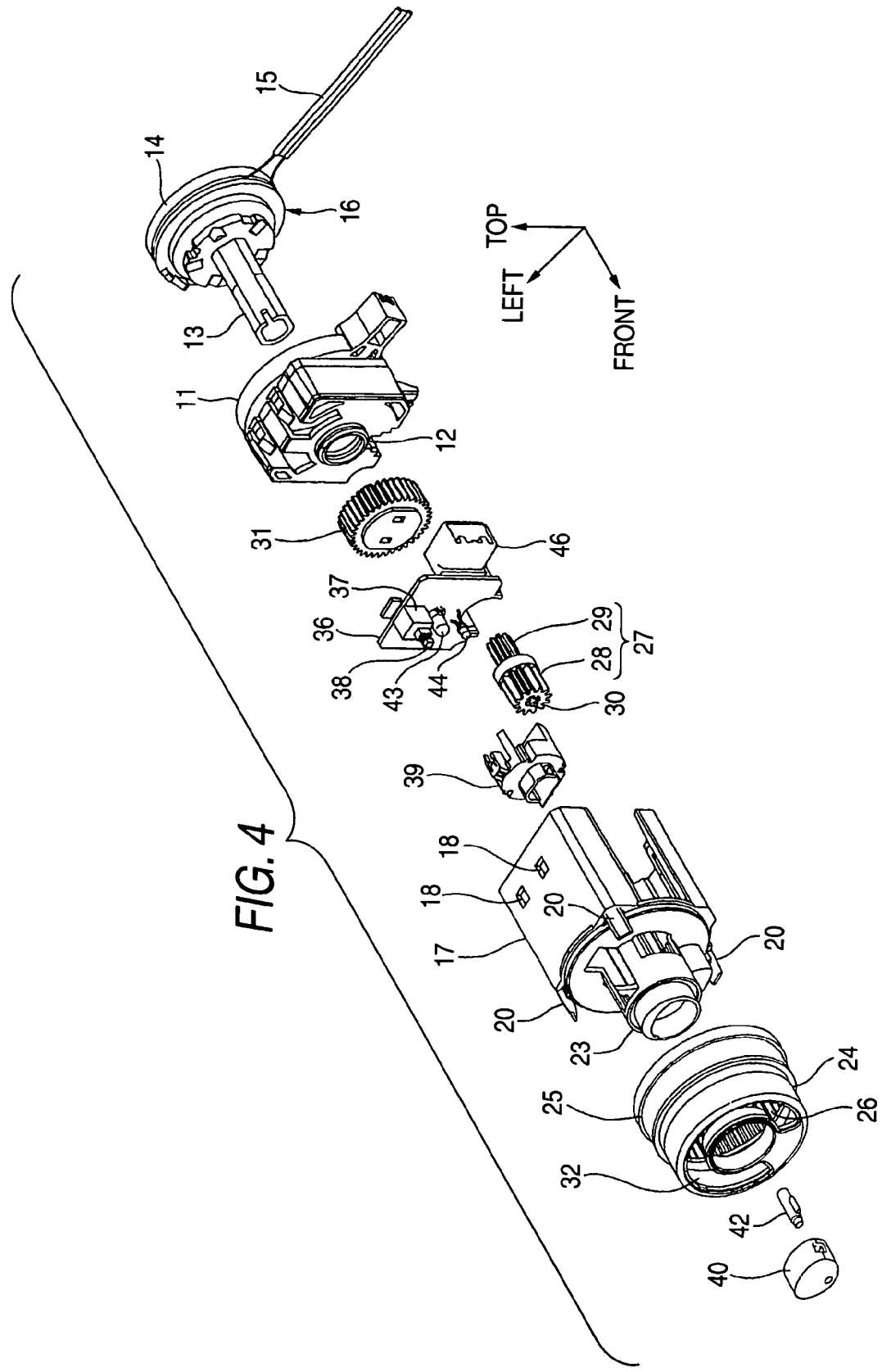
FIG. 4 is an exploded perspective view of the mode selection unit.

As shown in FIG. 4, a left end portion of a cable 15 is mechanically fixed to the cable base 14, while a right end portion of the cable 15 is movable in accordance with the cable base 14 rotating around the shaft 13. The shaft 13, the cable base 14 and the cable 15 constitute a cable unit 16. The right end portion of the cable 15 is mechanically connected to the air conditioner.

A unit body 17 made from synthetic resin is fixed to the unit base 11 as shown in FIG. 3B. As shown in FIG. 4, a plurality of mounting holes 18 are formed in the unit body 17. The plurality of mounting holes 18 are engaged with claw portions (not shown) of a cluster panel 19 (see FIG. 5) so that the unit body 17 is fixed to the cluster panel 19.

A plurality of snap fit portions 20 are formed integrally with an outer circumferential portion of the unit body 17 as shown in FIG. 4. The snap fit portions 20 are disposed circumferentially on a common circular track and at an equal pitch. As shown in FIG. 3B, each snap fit portion 20 is constituted by a foot portion 21 extending in the front/rear direction and a protruding claw portion 22 located in a front end portion of the foot portion 21.

A cylindrical dial base 23 is formed integrally with a front end portion of the unit body 17 as shown in FIG. 4. A dial 24 made from synthetic resin is fitted to an outer circumferential portion of the dial base 23 as shown in FIG. 3B, while a large-diameter ring-like seat portion 25 is formed integrally with a rear end portion of the dial 24 as shown in FIG. 4. A plurality of claw portions 22 are in engagement with the seat portion 25 as shown in FIG. 3B. Thus, due to the engagement force between each nail portion 22 and the seat portion 25, the dial 24 is prevented from being detached from the unit body 17. That is, the inner circumferential surface and the outer circumferential surface of the dial 24 are guided by the dial base 23 and the plurality of snap fit portions 20 so that the dial 24 is operated to rotate with respect to the unit body 17.

As shown in FIG. 4, a gear portion 26 is formed integrally with the inner circumferential surface of the dial 24. As shown in FIG. 3B, a large-diameter portion 28 of a main driving gear 27 is geared with the gear portion 26. The main driving gear 27 is formed out of synthetic resin as its material. As shown in FIG. 4, the main driving gear 27 has the gear-like large-diameter portion 28 and a gear-like small-diameter portion 29 integrally. As shown in FIG. 3B, the main driving gear 27 is attached to the unit body 17 rotatably around a shaft 30. When the dial 24 is operated, the main driving gear 27 rotates relatively to the dial 24.

A driven gear 31 made from synthetic resin is geared with the small-diameter portion 29 of the main driving gear 27. The driven gear 31 is fixed to the shaft 13 so that the driven gear 31 cannot rotate. When the dial 24 is operated, the driven gear 31 is operated to rotate through the main driving gear 27 so as to operate and move the cable 15. That is, the main driving gear 27 has a function as a transmission member for transmitting the operating force of the dial 24 to the driven gear 31 and a regulation member for regulating the rotation quantity of the driven gear 31 with respect to the operating quantity of the dial 24. Specifically, the ratio of the rotation quantity of the driven gear 31 to the operating quantity of the dial 24 is set to be "1:1".

An arc-shaped opening portion 32 is formed in the dial 24 as shown in FIG. 4. A mark plate 33 made from synthetic resin is fixed into the opening portion 32 as shown in FIG. 3B. A plurality of mode marks 34 are fixed to the mark plate 33 as shown in FIG. 3A.

A triangular pointer 35 is fixed to the front surface of the dial base 23 so as to be located in an inner circumferential portion of the dial 24. The pointer 35 indicates the wind blow position in cooperation with the mode marks 34. Specifically, when the dial 24 is operated to rotate to oppose one of the plurality of mode marks 34 to the outer circumferential portion of the pointer 35, the cable 15 moves in accordance with the rotation position of the dial 24. Thus, the air conditioner selectively opens an air outlet corresponding to the selected one of the mode marks 34.

A switch board 36 made from synthetic resin is fixed into the unit body 17 as shown in FIG. 3B. A switch 37 is mechanically fixed to the switchboard 36. The switch 37 is made of a lock-type push-push switch which is self-held in an on-state in which the plunger 38 has been operated to be pushed backward. A knob holder 39 made from synthetic resin is mechanically coupled with the plunger 38.

A knob 40 made from synthetic resin is fixed to the knob holder 39. A rear defogger mark 41 is fixed to the knob 40 as shown in FIG. 3A. As shown in FIG. 3B, the knob 40 is received in the dial base 23 so that the knob 40 cannot rotate. The knob 40 is disposed in a central portion of the dial 24 as shown in FIG. 3A. The knob 40 is designed to be able to slide in the front/rear direction relatively to the dial 24. When the knob 40 is operated backward from a front off-position, the plunger 38 of the switch 37 is turned on through the knob holder 39 so that the knob 40 is retained in an on-position where the knob 40 is pushed into the dial base 23 by the self-holding force of the switch 37. When the knob 40 is operated to be pushed backward in this state, a release of the switch 37 is actuated so that the knob 40 slides forward due to the restoring force of the plunger 38. Thus, the knob 40 returns to the front off-position.

A front end portion of a lens 42 is inserted into the knob 40 as shown in FIG. 3B. The lens 42 is formed out of colored transparent synthetic resin as its material, and fixed to the knob 40. In addition, a lamp 43 and an LED 44 are mechanically fixed to the switch board 36. The lamp 43 and the LED 44 are disposed at the rear of the rear defogger mark 41 and the lens 42 and in opposition thereto respectively. When the lamp 43 and the LED 44 emit light, the rear defogger mark 41 and the lens 42 are illuminated. In addition, a plurality of lamps (not shown) are fixed to the switch board 36 so as to be located at the rear of the plurality of mode marks 34 so that the plurality of mode marks 34 are illuminated by the plurality of rear lamps turned on, respectively.

A light shield plate 45 is formed integrally with the knob 40 between the rear defogger mark 41 and the lens 42. The light shield plate 45 has a rear end portion wrapping the LED 44 in the up/down direction. The light shield plate 45 prevents incident light from the lamp 43 and incident light from the LED 44 from being mixed with each other, and concentrates the incident light from the lamp 43 and the incident light from the LED 44 on the rear defogger mark 41 and the lens 42 respectively.

Figure 2:
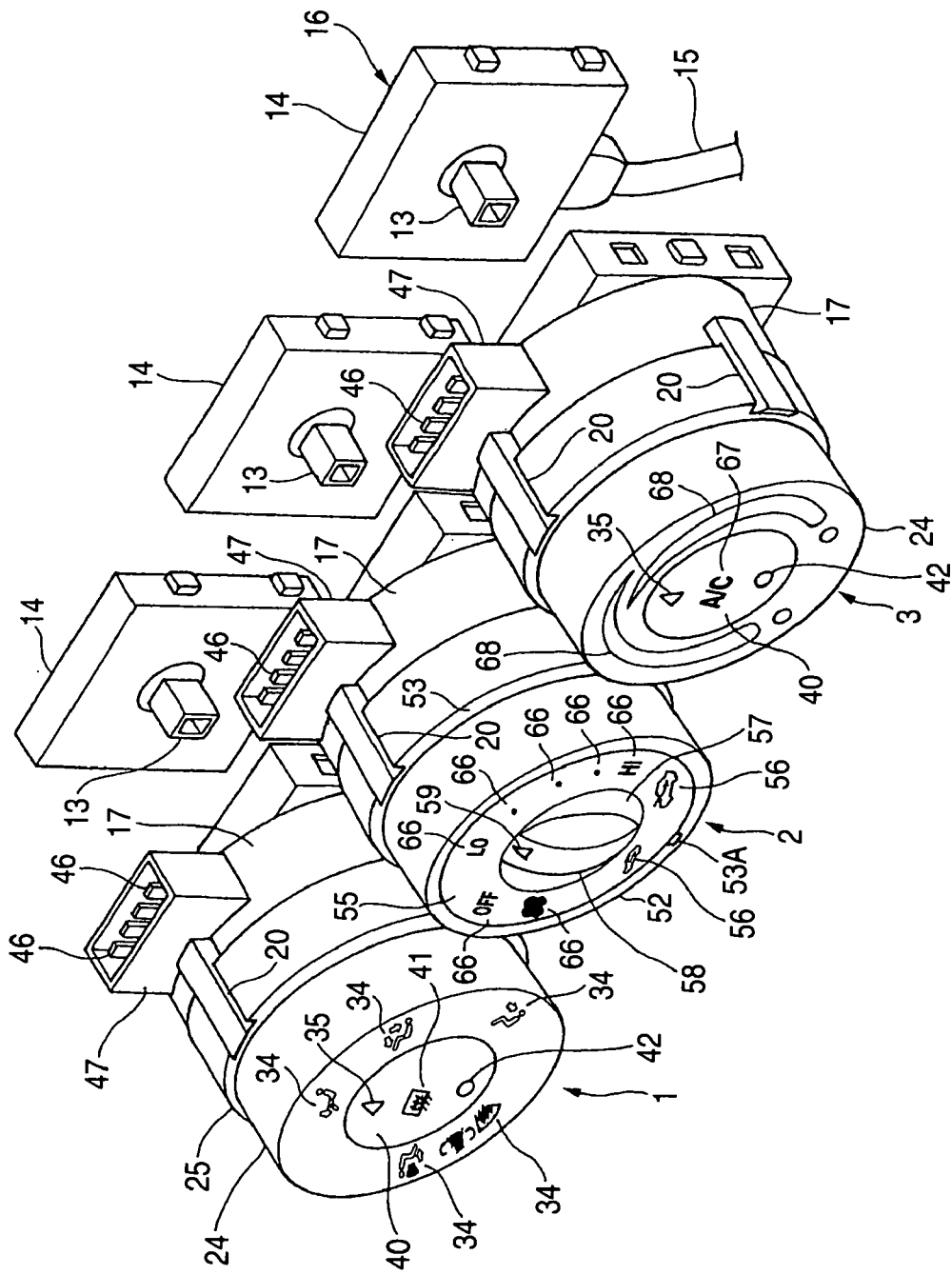
FIG. 2 is a perspective view showing the external appearance of the operating device.
Figure 5:
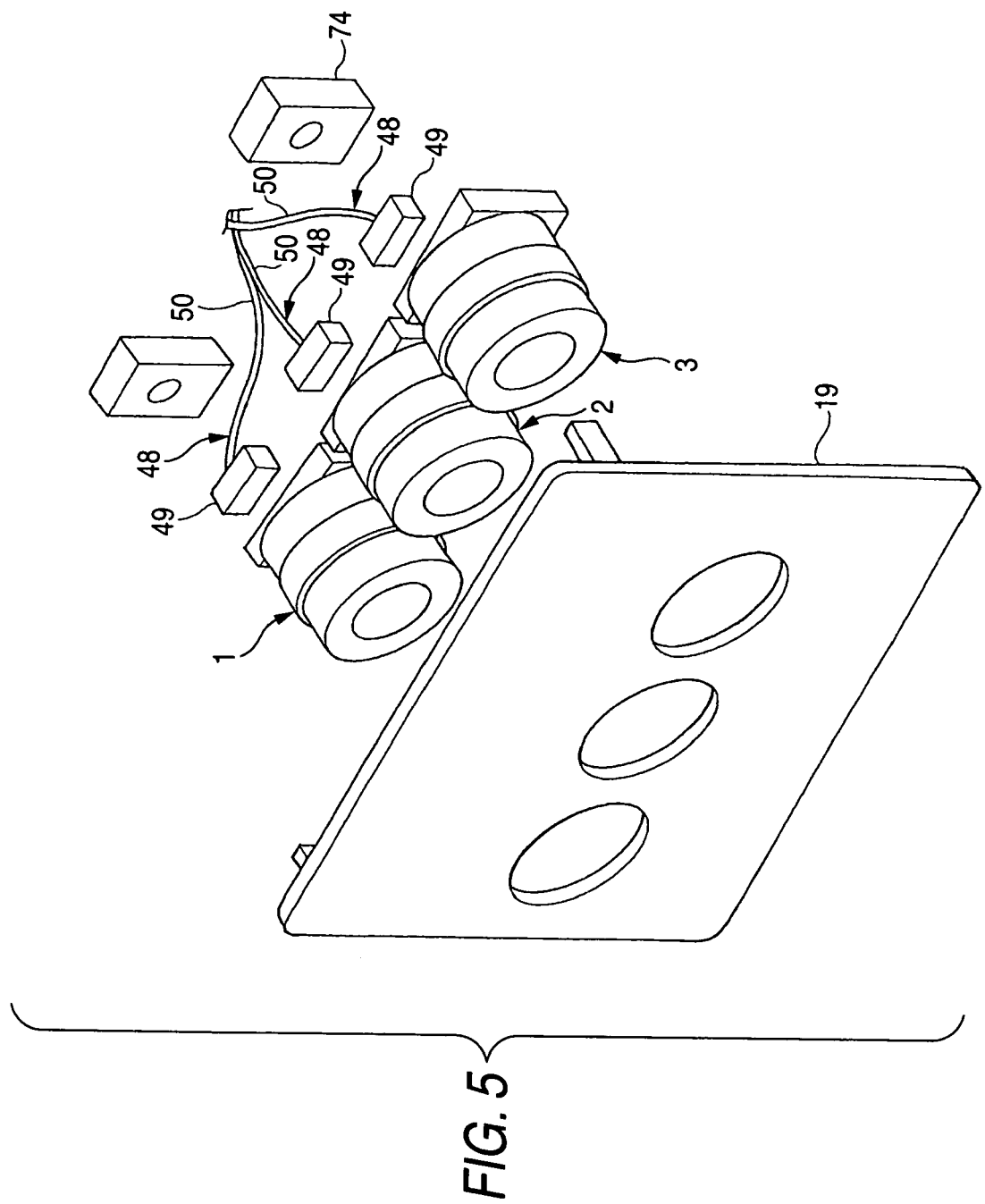
FIG. 5 is a view for explaining the procedure of assembling the operating device.

A plurality of conductive plates 46 (see FIG. 2) are mechanically fixed to the switch board 36 so that the switch 37, the lamp 43, the LED 44 and the plurality of lamps are electrically connected to the conductive plates 46 respectively. In addition, a connector housing 47 is formed integrally with the switch board 36 as shown in FIG. 2. One-end portions of the plurality of conductive plates 46 are received in the connector housing 47. As shown in FIG. 5, a connector 49 of a harness 48 is fitted to the connector housing 47 so that the switch 37, the lamp 43, the LED 44 and the plurality of lamps are electrically connected to a defogger device (not shown) through the connector 49 of the harness 48 and lead wires 50.

The defogger device heats the rear glass to thereby defog it. When the knob 40 is turned on, the switch 37 is turned on. When detecting that the switch 37 is turned on, the defogger device actuates its defogger function for a rear glass. Then, driving power is supplied to the LED 44 so that the lens 42 is illuminated. Thus, a driver is informed of the fact that the rear defogger function has been turned on.

2-2. Blower Unit 2

The blower unit 2 shares a large number of constituent parts with the mode selection unit 1. The blower unit 2 has points of difference from the mode selection unit 1 as follows.

As shown in FIG. 6B, a dial base 51 made from synthetic resin is fixed to a unit body 17. An outer dial 52 made from synthetic resin is fitted to the outer circumferential surface of the dial base 51. As shown in FIG. 2, a large-diameter seat portion 53 is engaged with a plurality of claw portions 22 of the unit body 17 so that the outer dial 52 can rotate but cannot fall out. As shown in FIG. 6B, a pointer 53A is fixed to the outer dial 52. A gear portion 26 is formed integrally with the inner circumferential portion of the outer dial 52. The gear portion 26 is geared with a large-diameter portion 28 of a main driving gear 27.

An arc-shaped opening portion 54 is formed in the dial base 51. A mark plate 55 made from synthetic resin is fixed into the opening portion 54 as shown in FIG. 6A. Two intake marks 56 are fixed to the mark plate 55. When the outer dial 52 is operated to rotate so as to selectively oppose the pointer 53A against the outer circumferential portion of one of the intake marks 56, a cable 15 moves in accordance with the rotation position of the outer dial 52. The air conditioner detects the moving position of the cable 15, and selectively opens an inside air intake for taking the inside air or an outside air intake for taking the outside air, in accordance with the selected one of the intake marks 56.

An inner dial 57 made from synthetic resin is attached to the inner circumferential surface of the dial base 51 as shown in FIG. 6A. A protruding dial operating portion 58 is formed integrally with the front surface of the inner dial 57. A front end portion of a lens 59 serving as a pointer is fixed to the dial operating portion 58 as shown in FIG. 6B. When a lamp 43 of a switch board 36 is turned on, the lens 59 is illuminated.

A shaft 61 of a contact holder 60 is fixed to the inner dial 57. A movable contact 63 is coupled with the contact holder 60 through a contact spring 62. The movable contact 63 is pressed onto a fixed contact 64 by a spring force of the contact spring 62. The fixed contact 64 together with the movable contact 63 forms a blower switch 65. The fixed contact 64 is fixed to the switchboard 36. A connector 49 of a harness 48 is fitted to a housing 47 so that the blower switch 65 is electrically connected to the air conditioner. The air conditioner sets the wind blow rate based on an output signal from the blower switch 65.

A plurality of blower marks 66 are fixed to the mark plate 55 as shown in FIG. 6A. The plurality of blower marks 66 and the plurality of intake marks 56 are illuminated with a plurality of lamps of the switch board 36 when these lamps are turned on. When the inner dial 57 is operated to rotate to selectively oppose the lens 59 to the inner circumferential portion of one of the blower marks 66, a signal corresponding to the rotation position of the inner dial 57 is outputted from the blower switch 65. Then, the air conditioner sets the wind blow rate based on the output signal from the blower switch 65 so as to control the wind blow rate to have a value corresponding to the selection one of the blower marks 66.

2-3. Temperature Control Unit 3

The temperature control unit 3 shares a large number of constituent parts with the mode selection unit 1. Points of difference from the mode selection unit 1 will be described below.

An air conditioning mark 67 is fixed to a knob 40 so as to be located in front of a lamp 43 as shown in FIG. 2. When the knob 40 is in an off state, the air conditioner detects the off state of a switch 37, and selectively makes its heater function valid. In this state, an LED 44 is turned off so as to inform the driver of the off state of the air conditioner function. On the other hand, when the knob 40 is in an on state, the air conditioner detects the on state of the switch 37, and selectively makes the air conditioner function valid. In this on state, the LED 44 is turned on so that the lens 42 is illuminated. Thus, the driver is informed of the on state of the air conditioner function.

Two temperature marks 68 are fixed to a dial 24. When the dial 24 is operated to rotate to oppose a predetermined position of one of the temperature marks 68 to the outer circumferential portion of a pointer 35, a cable 15 moves in accordance with the rotation position of the dial 24, and the air conditioner sets the wind blow temperature in accordance with the moving position of the cable 15.

3. Heaterless Specification

The heaterless specification denotes a specification having only the air conditioner function. In the heaterless specification, a mode selection unit 1 and a blower unit 2 having the same configurations as those in the normal specification are used, but a temperature control unit 3 having a different configuration from that in the normal specification is used. Description will be made below about the temperature control unit 3.

Figure 7:
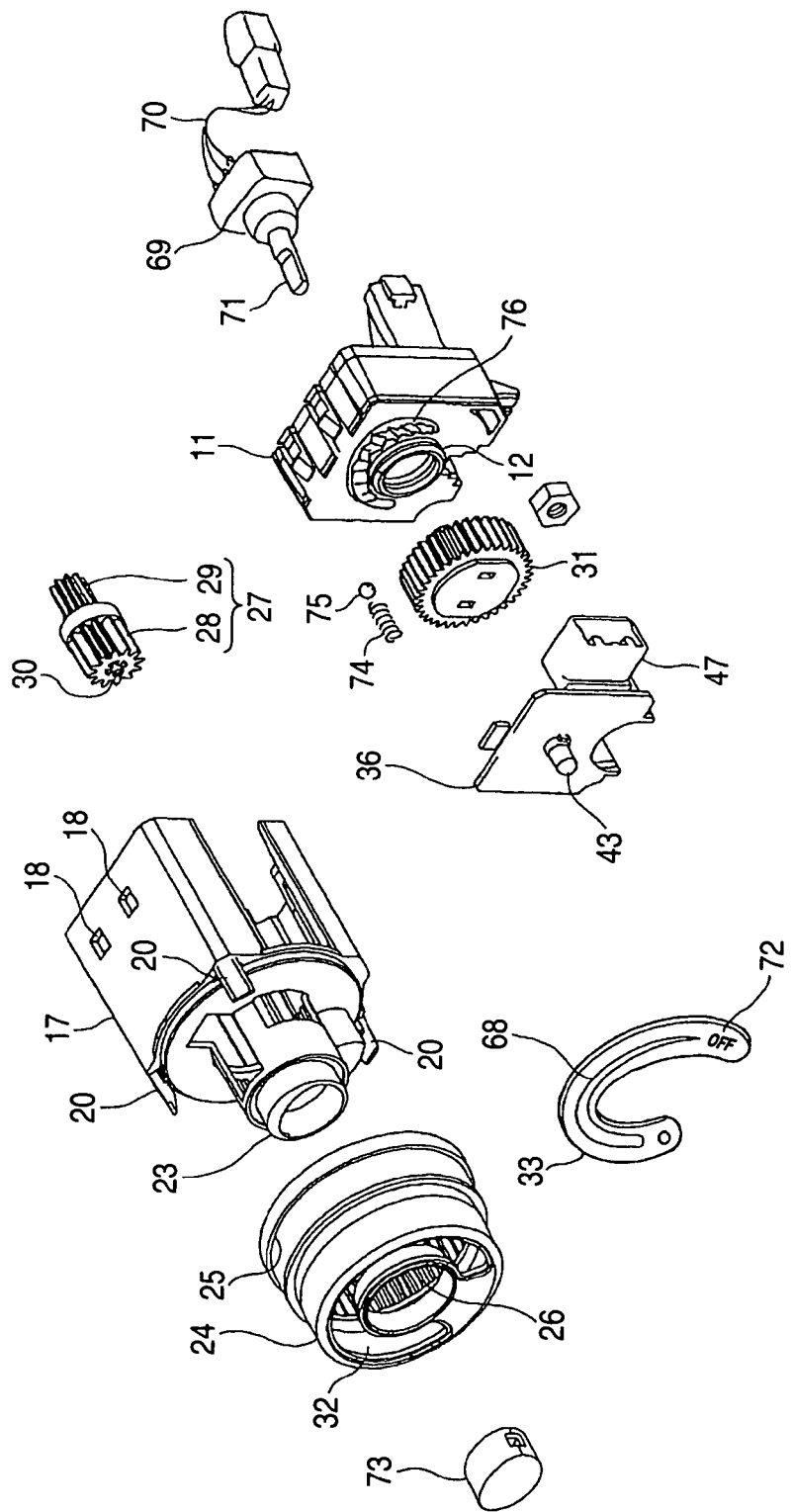
FIG. 7 is an exploded perspective view of a temperature control unit (heaterless specification).

A volume 69 is fixed to a unit base 11 as shown in FIG. 7. The volume 69 is electrically connected to the air conditioner through a harness 70. In addition, a driven gear 31 is fixed to a shaft 71 of the volume 69. The driven gear 31 is mechanically coupled with a gear portion 26 of a dial 24 through a main driving gear 27. When the dial 24 is operated, the shaft 71 is operated to rotate through the main driving gear 27 and the driven gear 31.

A recess portion (not shown) is formed in a rear end portion of the driven gear 31. A temperance spring 74 made of a compression coil spring is received in the recess portion. A temperance ball 75 is fixed to a rear end portion of the temperance spring 74. The temperance ball 75 is pressed onto a temperance portion 76 by a spring force of the temperance spring 74. The temperance portion 76 denotes an irregular portion formed integrally with the front surface of the unit base 11. When the dial 24 is operated, the temperance ball 75 is intermittently engaged with a recess portion of the temperance portion 76 by the spring force of the temperance spring 74. Thus, a sense of temperance is afforded.

An off mark 72 is fixed to a mark plate 33 of the dial 24. When the off mark 72 is aligned with a pointer 35, an output signal from the volume 69 reaches a threshold value, so that the air conditioner function of the air conditioner is turned off. In addition, a temperature mark 68 is provided in the mark plate 33. When the temperature mark 68 is pointed by the pointer 35, the output signal from the volume 69 escapes from the threshold value, so that the air conditioner function of the air conditioner is turned on. In this event, the output signal of the volume 69 has magnitude corresponding to the rotation position of the dial 24, and the air conditioner controls the wind blow temperature in accordance with the magnitude of the output signal. That is, the dial 24 has both the on/off function of turning on/off the air conditioner function, and the temperature control function.

A dummy knob 73 is attached to a central portion of the dial 24 so that the dummy knob 73 cannot be operated. The switch 37, the LED 44 and the knob holder 39 are absent.

4. Air-Conditionerless Specification

Figure 8:
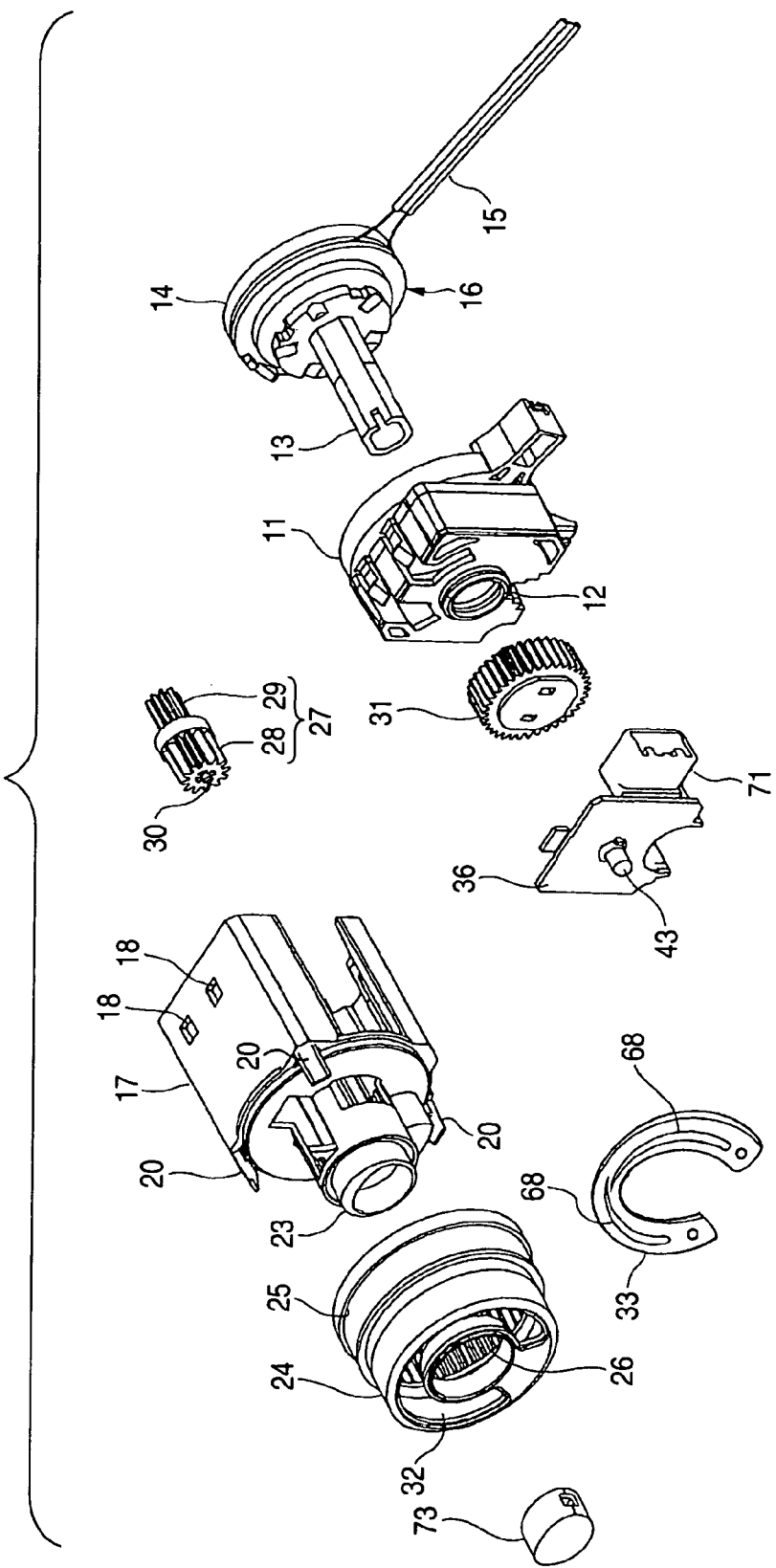
FIG. 8 is an exploded perspective view of a temperature control unit (air-conditionerless specification).

The air-conditionerless specification denotes a specification having only the heater function. In the air-conditionerless specification, a mode selection unit 1 and a blower unit 2 having the same configurations as those in the normal specification are used, but a temperature control unit 3 having a different configuration from that in the normal configuration is used. In the temperature control unit 3, as shown in FIG. 8, a dummy knob 73 is attached to a central portion of a dial 24 so that the dummy knob 73 cannot be operated, and the switch board 36 and the knob holder 39 are absent. In the air-conditionerless specification, the blow temperature from a heater is controlled by the dial 24 of the temperature control unit 3, the blow position is selected by a dial 24 of the mode selection unit 1, and the blow rate is controlled by an inner dial 57 of the blower unit 2.

5. Heaterless and Air-Conditionerless Specification

Figure 9:
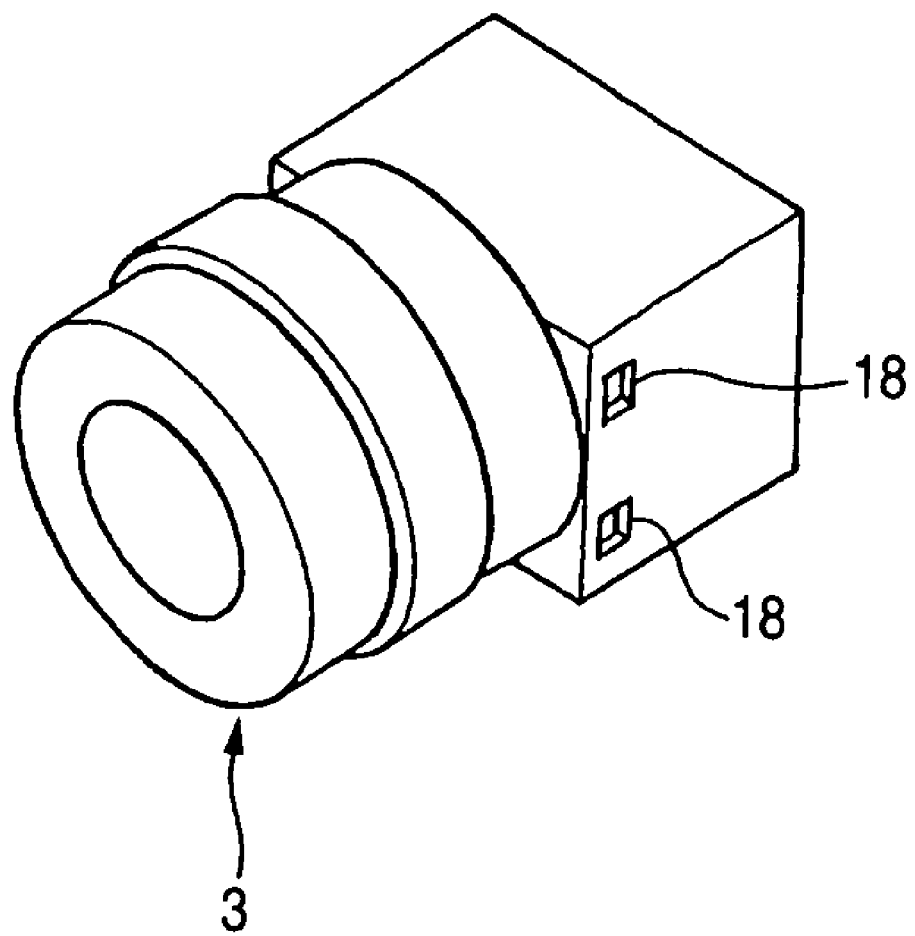
FIG. 9 is an exploded perspective view of a temperature control unit (air-conditionerless and heaterless specification).
Figure 10:
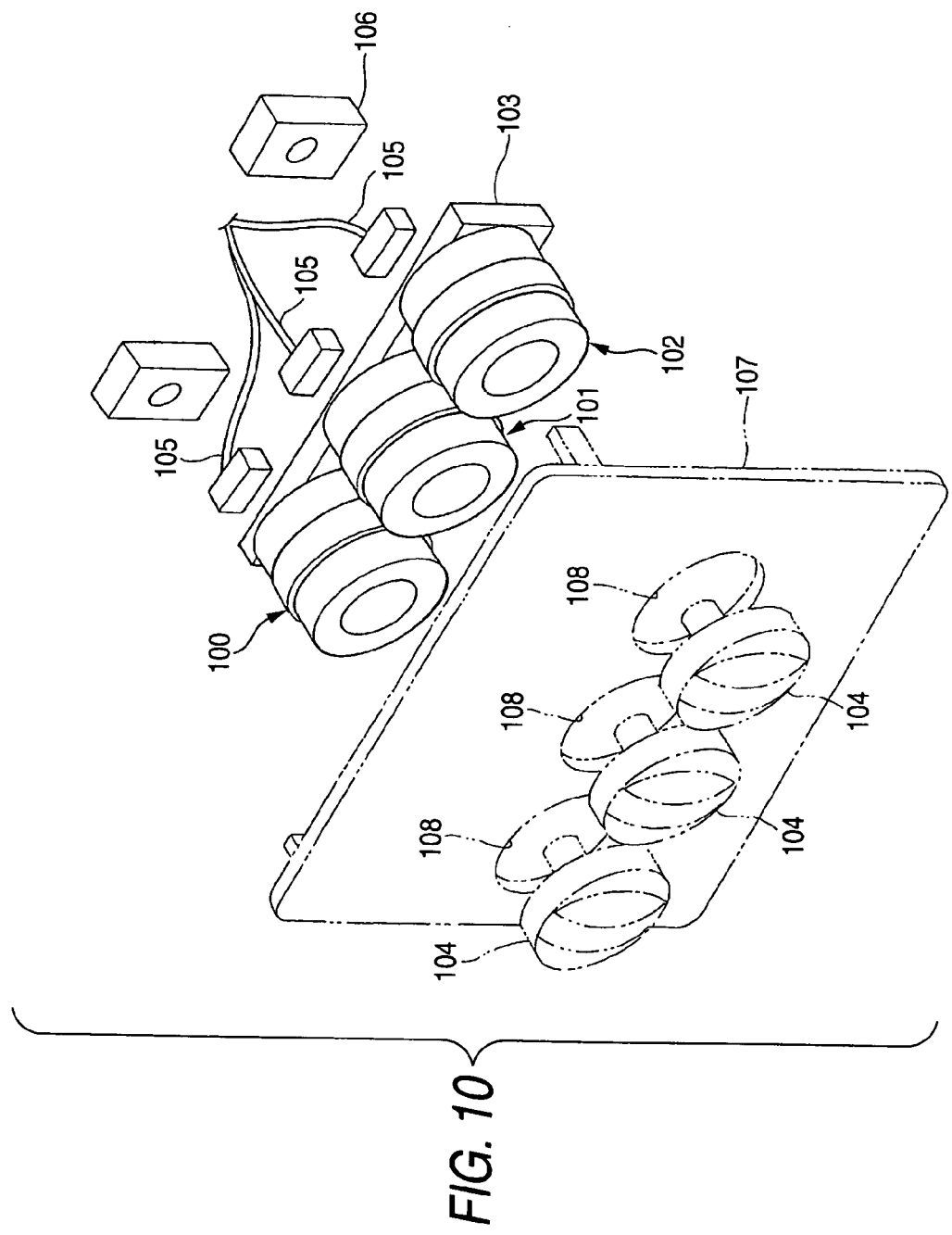
FIG. 10 is a view showing an example in the background art.

The heaterless and air-conditionerless specification denotes a specification having only a function of blowing a normal-temperature wind into the inside of the car. In the heaterless and air-conditionerless specification, a mode selection unit 1 and a blower unit 2 having the same configurations as those in the normal specification are used, but a temperature control unit 3 having a different configuration from that in the normal configuration is used. The temperature control unit 3 is, as shown in FIG. 9, constituted by a dummy knob having mounting holes 18 to be engaged with claw portions of a cluster panel 19 so that the dummy knob cannot be operated. In the heaterless and air-conditionerless specification, the blow position of a normal-temperature wind is selected by a dial 24 of the mode selection unit 1, and the blow rate is controlled by an inner dial 57 of the blower unit 2.

6. Procedure of Installing Mode Selection Unit 1 to Temperature Control Unit 3 (See FIG. 5)

1) The connectors 49 of the harnesses 48 are fitted to the connector housings 47 of the mode selection unit 1, the blower unit 2 and the temperature control unit 3.
2) The claw portions of the cluster panel 19 are engaged with the mounting holes 18 of the mode selection unit 1, the blower unit 2 and the temperature control unit 3 so that the mode selection unit 1, the blower unit 2 and the temperature control unit 3 are fixed to the cluster panel 19.
3) The cluster panel 19 is fixed to the instrument panel 74.

According to the aforementioned embodiment, the mode selection unit 1, the blower unit 2 and the temperature control unit 3 are arranged as operating mechanisms mechanically separated from one another. Accordingly, the degree of freedom in the layout of the mode selection unit 1 to the temperature control unit 3 is improved so that the mode selection unit 1 to the temperature control unit 3 can be disposed along the arc-shaped cluster panel 19 (see FIG. 1A), disposed in a triangular shape or aligned lengthwise. It is therefore easy to dispose the mode selection unit 1 to the temperature control unit 3 in accordance with the car-side design.

In addition, the mode selection unit 1 to the temperature control unit 3 are engaged with the cluster panel 19, and the cluster panel 19 is attached to the instrument panel 74. Accordingly, it is not necessary to screw the mode selection unit 1 to the temperature control unit 3 down to the cluster panel 19. Thus, the installation cost can be reduced.

The embodiment shows an example in which the air conditioner is operated mechanically through the cables 15 using the mode selection unit 1 having the normal specification, the heaterless specification, the air-conditionerless specification or the heaterless and air-conditionerless specification, the blower unit 2 having the normal specification, the heaterless specification, the air-conditionerless specification or the heaterless and air-conditionerless specification, and the temperature control unit 3 having the normal specification. The invention is not limited to such an example. For example, a temperature control unit 3 having the heaterless specification using an electronic device such as the volume 69 for electrically operating the air conditioner may be used.

In the aforementioned embodiment, in order to give a sense of temperance to the dial operation of the temperature control unit 3 having the heaterless specification, the temperance spring 74 and the temperance ball 75 are provided in the driven gear 31, and the temperance portion 76 is provided in the unit base 11. The invention is not limited to such a configuration. For example, a temperance mechanism constituted by the temperance spring 74, the temperance ball 75 and the temperance portion 76 may be built in the inside of the volume 69.

What is claimed is:

1. An operating device of a vehicle air-conditioner, comprising:
    a first operating unit for controlling a direction of air flow, the first operating unit has a mounting hole;
    a second operating unit for controlling an air flow rate, the second operating unit has a mounting hole;
    a third operating unit for controlling an air temperature, the third operating unit has a mounting hole;
    a cluster panel having claw portions; and
    an instrument panel,
    wherein the first to third operating units operate independently of one another and are fixed to the cluster panel individually by engaging the mounting holes with the claw portions of the cluster panel;
    wherein the cluster panel having the operating units fitted thereto is fixed to the instrument panel; and
    wherein at least one of the operating units comprises:
        a dial having a gear portion formed on an inner circumferential surface;
        a driving gear having a large-diameter portion that meshes with the gear portion of the dial, and a small-diameter portion;
        and a driven gear that meshes with the small-diameter portion of the driving gear.

2. A method of installing an operating device of a vehicle air conditioner that includes: a first operating unit for controlling a direction of air flow; a second operating unit for controlling an air flow rate; and a third operating unit for controlling an air temperature, the first to third operating units having mounting holes respectively, wherein the first to third operating units operate independently of one another, the method comprising the steps of:
    electrically connecting harnesses to the first to third operating units;
    after the connecting step, engaging the mounting holes of the first to third operating units with claw portions of a cluster panel; and
    attaching the cluster panel having the operating units fitted thereto to an instrument panel at a rear side,
    wherein at least one of the operating units comprises:

a dial having a gear portion formed on an inner circumferential surface;

a driving gear having a large-diameter portion mechanically coupled with the gear portion of the dial, and a small-diameter portion; and a driven gear mechanically coupled with the small-diameter portion of the driving gear.

3. The operating device of claim 1, further comprising a knob disposed in a central portion of the dial capable of sliding in relation to the dial to operate a switch.

4. The operating device of claim 3, further comprising a lens inserted into the knob that allows illumination from a side of the lens opposite a driver of the vehicle.

5. The operating device of claim 1, wherein the driven gear includes a recess portion that receives one end of a compression coil spring, the other end of the compression spring pressing a ball into one of a plurality of recessed portions of a surface.

* * * * *